United States Patent
Yu et al.

(10) Patent No.: US 11,394,168 B1
(45) Date of Patent: Jul. 19, 2022

(54) MICRO NON-PLANAR RING OSCILLATOR WITH OPTIMIZED OUTPUT POWER AND MINIMIZED NOISE IN A REDUCED SIZE PACKAGE

(71) Applicant: United States of America as represented by the Administrator of NASA, Washington, DC (US)

(72) Inventors: Anthony Yu, Greenbelt, MD (US); Kenji Numata, Greenbelt, MD (US)

(73) Assignee: United States of America as represented by the Administrator of NASA, Washington, DC (US)

(*) Notice: Subject to any disclaimer, the term of this patent is extended or adjusted under 35 U.S.C. 154(b) by 12 days.

(21) Appl. No.: 16/432,601

(22) Filed: Jun. 5, 2019

(51) Int. Cl.
*H01S 3/102* (2006.01)
*H01S 3/0941* (2006.01)
(Continued)

(52) U.S. Cl.
CPC .......... *H01S 3/1028* (2013.01); *H01S 3/0606* (2013.01); *H01S 3/0615* (2013.01); *H01S 3/0617* (2013.01); *H01S 3/0627* (2013.01); *H01S 3/083* (2013.01); *H01S 3/0941* (2013.01); *H01S 3/102* (2013.01); *H01S 3/105* (2013.01); *H01S 3/1022* (2013.01); *H01S 3/1312* (2013.01); *H01S 3/1611* (2013.01); *H01S 3/1623* (2013.01); *H01S 3/1643* (2013.01); *H01S 3/1696* (2013.01); *H01S 3/2308* (2013.01); *H01S 3/2375* (2013.01)

(58) Field of Classification Search
CPC .... H01S 3/0615; H01S 3/0617; H01S 3/1026; H01S 3/105; H01S 3/1028; H01S 3/1317; H01S 3/1022; H01S 3/1312; H01S 3/083; H01S 3/0606; H01S 3/2375; H01S 3/2308
See application file for complete search history.

(56) References Cited

U.S. PATENT DOCUMENTS

| | | | | |
|---|---|---|---|---|
| 4,747,111 A | * | 5/1988 | Trutna, Jr. | H01S 3/083 372/37 |
| 4,749,842 A | * | 6/1988 | Kane | H01S 3/042 219/121.61 |

(Continued)

FOREIGN PATENT DOCUMENTS

| CN | 1897370 A | * | 1/2007 |
|---|---|---|---|
| CN | 200959480 Y | * | 10/2007 |

(Continued)

OTHER PUBLICATIONS

Series 125/126 User's Manual, Jun. 22, 2002, Lightwave Electronics, 1-55. (Year: 2002).*

(Continued)

*Primary Examiner* — Joshua King
(74) *Attorney, Agent, or Firm* — Christopher O. Edwards; Bryan A. Geurts; Helen M. Galus

(57) ABSTRACT

A master oscillator configured as a seed laser for a laser optical module includes a reduced size, temperature controlled non-planar ring oscillator, a piezo-electric transducer mounted on the non-planar ring oscillator, a pump laser diode, and coupling optics configured to couple a laser output of the pump laser diode to an end face of the non-planar ring oscillator. The pump laser diode may operate as a single-mode pump.

14 Claims, 5 Drawing Sheets

(51) Int. Cl.
*H01S 3/105* (2006.01)
*H01S 3/16* (2006.01)
*H01S 3/131* (2006.01)
*H01S 3/083* (2006.01)
*H01S 3/06* (2006.01)
*H01S 3/23* (2006.01)

(56) References Cited

U.S. PATENT DOCUMENTS

| | | | | |
|---|---|---|---|---|
| 4,797,896 | A | * | 1/1989 | Kane .................. H01S 3/042 372/34 |
| 4,829,532 | A | * | 5/1989 | Kane .................. H01S 3/0606 372/20 |
| 5,007,065 | A | * | 4/1991 | Trutna, Jr. ........... H01S 3/0606 372/20 |
| 5,027,360 | A | * | 6/1991 | Nabors .............. H01S 3/10092 372/18 |
| 5,027,361 | A | * | 6/1991 | Kozlovsky ............... G02F 1/37 359/328 |
| 5,027,367 | A | * | 6/1991 | Rea, Jr. ................ H01S 3/0606 372/37 |
| 5,177,764 | A | * | 1/1993 | Nilsson ................ H01S 3/0606 372/105 |
| 5,329,539 | A | * | 7/1994 | Pearson .................. H01S 3/042 372/36 |
| 5,420,878 | A | * | 5/1995 | Kane ........................ H01S 3/16 359/328 |
| 6,002,704 | A | * | 12/1999 | Freitag ................ H01S 3/0606 372/11 |
| 6,580,052 | B1 | * | 6/2003 | Bartelt-Berger ..... G02B 6/4216 219/121.64 |
| 6,654,392 | B1 | * | 11/2003 | Arbore .................... H01S 3/025 372/20 |
| 2010/0272130 | A1 | * | 10/2010 | Mu ........................ H01S 3/093 372/10 |
| 2013/0135708 | A1 | * | 5/2013 | Richman ................ G02F 1/315 359/298 |

FOREIGN PATENT DOCUMENTS

| | | | |
|---|---|---|---|
| CN | 103296570 A | * | 9/2013 |
| CN | 204103242 U | * | 1/2015 |
| WO | WO-0135503 A1 | * | 5/2001 ........... H01S 3/0675 |

OTHER PUBLICATIONS

Product Bulletin SDL-5400 Series, Jan. 2002, JDS Uniphase, 1-6. (Year: 2002).*

Wang et al., "Stable High-Power Er:YAG Ceramic Single-Frequency Laser at 1645 nm", Jun. 23, 2016, Optics Express, vol. 24, No. 13, 14966-14973. (Year: 2016).*

Heurs et al., "Intensity and Frequency Noise Reduction of a Nd:YAG NPRO via Pump Light Stabilisation," 2006, Appl. Phys. B, DOI: 10.1007/s00340-006-2381-0. (Year: 2006).*

Paschotta, "YAG Lasers," May 2006, RP-Photonics Encyclopedia, www.rp-photonics.com/yag_lasers.html (Year: 2006).*

Kane et al., "Fast Frequency Tuning and Phase Locking of Diode-Pumped Nd:YAG Ring Lasers", Nov. 1988, Optics Letters, vol. 13, No. 11, 970-972. (Year: 1988).*

* cited by examiner

MICRO NON-PLANAR RING OSCILLATOR WITH OPTIMIZED OUTPUT POWER AND MINIMIZED NOISE IN A REDUCED SIZE PACKAGE

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefor.

BACKGROUND

Space based gravitational wave detection applications typically require measuring picometer variations over distances of more than 1 million kilometers, thus requiring precision interferometry with a low noise, high power laser source. These types of laser sources, due to their low noise properties, may be used as stable laser sources for laser metrology, laser spectroscopy and timing applications. These types of lasers may also be used as single frequency, low noise seed sources for high power continuous wave or pulsed laser systems for measuring wind, spectroscopy and metrology. Typical laser systems for these applications may use a wavelength of 1064 nm. Neodymium doped Yttrium Aluminum Garnet (Nd:YAG) non-planar ring oscillators (NPROs) have been known to have very good frequency noise performance in solid state laser applications. Unidirectional NPROs with the use of an applied external magnetic field advantageously have no standing wave, which avoids spatial hole burning, exhibit higher single mode power than linear resonators, and because they are monolithic, exhibit excellent frequency stability and tolerance to misalignment. Current NPROs are typically based on a Nd:YAG crystal with approximate dimensions of ~1 cm×~1 cm×~2 mm, and are pumped with a multimode pump laser diode at 808 nm to produce approximately 100~800 mW of output power. FIG. 1 shows a schematic diagram of a typical NPRO.

However, the relatively large NPRO crystal size may limit the mode-hop-free tuning range to be <10 GHz (typically ~5 GHz), and generally limits the packaged optics size to >~100 cm^3. The large crystal may also emit excessive output power, in particular when used as a seed laser pumped with one or more high-power multimode diodes (typically ~1 W). Conversely, when the large NPRO crystal is pumped at a low power to limit the output power to an approximate 10~300 mW level, most of the gain media is left un-pumped, resulting in an optical loss in the monolithic laser cavity, degrading the performance. In addition, large crystal NPROs are not compatible with opto-mechanical parts and electro-optics developed for standard diode lasers, such as butterfly-packaged diode mounts used in the telecom industry. Furthermore, an output power>300 mW is usually too high for most fiber optics, such as lithium-niobate modulators, and Ytterbium doped fiber optical amplifiers that may be used downstream of the NPRO.

Nd:YAG microchip lasers are also known to be able to emit single longitudinal-mode outputs. However, their frequency stability, polarization stability, beam quality, mode stability, and output power stability are typically much lower than that of a non-planar ring oscillator NPRO, at least in part because they typically use a linear (non-ring) cavity design with <~1 mm length, where the spatial hole burning effect cannot be avoided.

SUMMARY

The disclosed embodiments are directed to a master oscillator configured as a seed laser for a laser optical module, where the master oscillator includes a temperature controlled non-planar ring oscillator, a piezo-electric transducer on which the non-planar ring oscillator is mounted, a pump laser diode, and coupling optics configured to couple a laser output of the pump laser diode to an end face of the non-planar ring oscillator.

The non-planar ring oscillator may have a volume of approximately 1-18 mm$^3$.

The non-planar ring oscillator may have a width, height, and length of approximately 3 mm, 1.2 mm, and 4.5 mm, respectively, and a dihedral angle of approximately 45°.

The non-planar ring oscillator may include an end face, where an output of the pump laser diode and the reflectivity of the end face are configured to provide an output power of the non-planar ring oscillator of approximately 10~500 mW.

The end face may have a convex shape to better define spatial modes of the laser cavity and to lower lasing threshold.

The end face may have a radius of curvature of approximately 10 mm-1 m.

The non-planar ring oscillator may be made of an Nd:YAG material.

The non-planar ring oscillator may be made of a Cr:Nd:YAG material.

The non-planar ring oscillator may be made of a Ce:Nd:YAG material.

The non-planar ring oscillator may be made of a ceramic Nd:YAG material with Nd doping of greater than 1.1%.

The master oscillator may include a temperature control element for coarse tuning the output frequency of the non-planar ring oscillator slowly through a change in the optical length of the non-planar ring oscillator.

The piezo-electric actuator may be configured to fine tune the output frequency of the non-planar ring oscillator rapidly through a change in a cavity length.

The master oscillator may include a magnet mounted proximate the non-planar ring oscillator for applying a magnetic field to the non-planar ring oscillator to cause unidirectional oscillation. The magnetic field may be varied to tune the output frequency of the oscillator.

The pump laser diode may have an output wavelength of approximately 808 nm.

The pump laser diode may have an output wavelength of approximately 885 nm.

The pump laser diode may have an output wavelength of approximately 914 nm.

The pump laser diode may have an output power of approximately 50 mW~1 W.

The pump laser diode may operate as a spatially single-mode with an exemplary beam quality factor of approximately M$^2$<1.3.

The coupling optics may be configured to position an output of the pump laser diode on an end face of the non-planar ring oscillator such that a pump and a main output laser spatially overlap.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
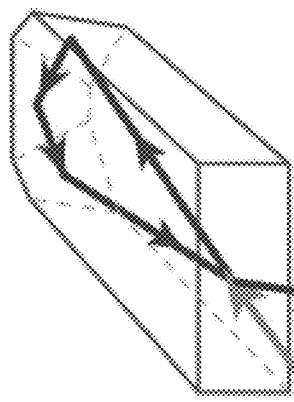
FIG. 1 shows a schematic diagram of a prior art NPRO.

Although the disclosed embodiments will be described with reference to the embodiments shown in the drawings and described below, it should be understood that these could be embodied in many alternate forms. In addition, any suitable size, shape or type of elements or materials could be used.

The disclosed embodiments are generally directed to a reduced size NPRO, with the same or an improved noise performance, with an optimized, lower output power level suited for fiber optics, resulting in a seed laser system with an improved SWaP (size, weight and power).

Figure 2:
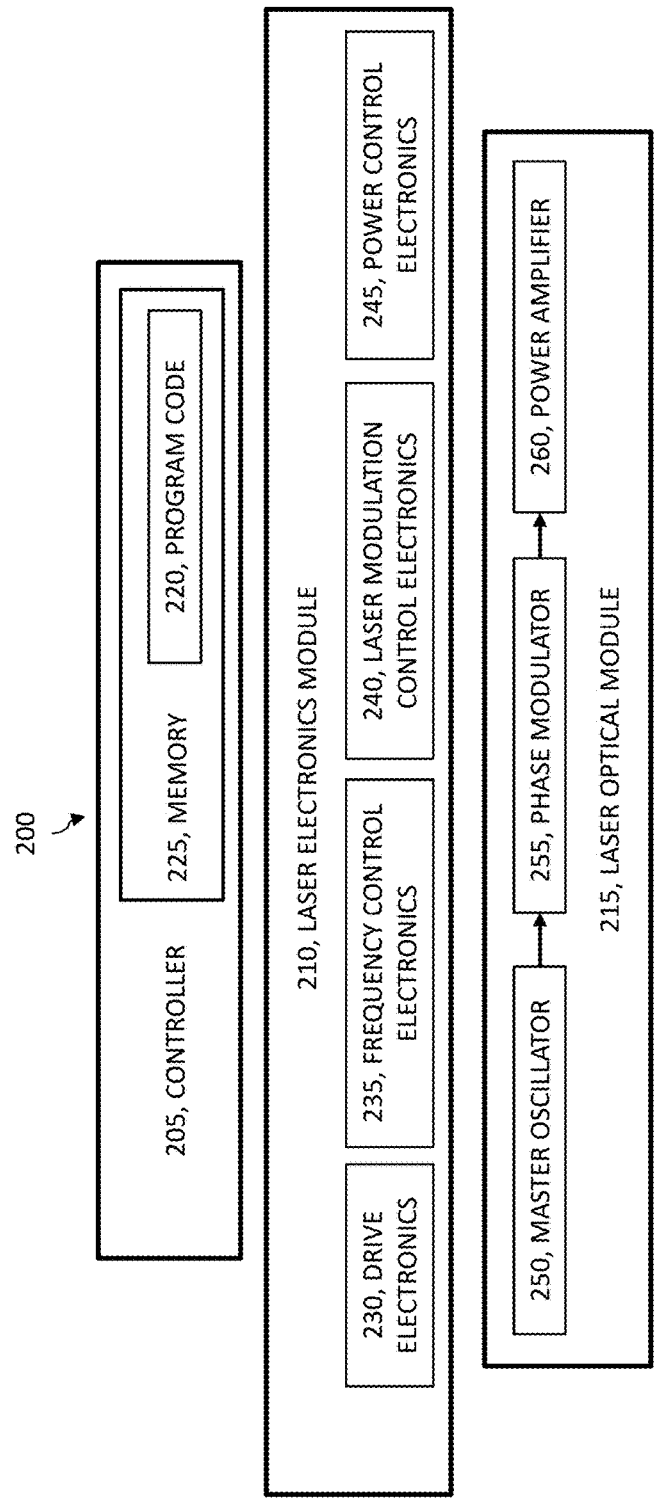
FIG. 2 shows a schematic block diagram of an exemplary laser system providing precision interferometry.

FIG. 2 shows a schematic block diagram of the basic components of an exemplary laser system 200 providing precision interferometry, for example for space based gravitational wave detection, metrology, laser spectroscopy and timing applications, according to the disclosed embodiments. The laser system 200 may have a master oscillator, power amplifier architecture that operates to separate the problems of achieving low noise, high power, and gigahertz phase modulation. The laser system 200 may include a controller 205, a laser electronics module 210 and a laser optical module 215.

The controller 205 may generally include computer readable program code 220 stored on at least one computer readable medium for carrying out and executing the process steps described herein. The computer readable medium may be a memory 225 of the controller 205. In alternate aspects, the computer readable program code may be stored in a memory external to, or remote from, the controller 205. The memory 225 may include magnetic media, semiconductor media, optical media, or any media which is readable and executable by a computer.

The laser electronics module 210 may include drive electronics 230, frequency control electronics 235, laser modulation control electronics 240, and power control electronics 245. The laser optical module 215 may include a master oscillator 250, a phase modulator 255, and a power amplifier 260. The master oscillator 250 may operate as a seed laser at an approximate 10~100 mW level, with a maximum output of approximately 300 mW. The fiber coupled phase modulator 255 may be implemented as a waveguide phase modulator. The power amplifier 260 may include a pump laser in combination with a fiber amplifier that operates to amplify the output of the master oscillator to an output in the order of, for example, approximately 2 watts.

The master oscillator 250 may be implemented using an NPRO with reduced dimensions and enhanced lasing characteristics, referred to as a micro non-planar ring oscillator (mNPRO). The reduced dimensions and enhanced lasing characteristics may cause the mNPRO to exhibit a larger free spectral range, including a wider mode-hop free tuning range with less coupling between neighboring modes, and a larger spatial overlap between pump and signal beams within the oscillator that minimizes the un-pumped region. The disclosed embodiments are also directed to an mNPRO with a reduced mass and volume that may permit the use of piezo-electric actuator with less mass and volume, resulting in a wider frequency tuning bandwidth, better in-loop noise suppression, more efficient tuning, improved thermal control with a more uniform temperature, and faster heat extraction.

Figure 3:
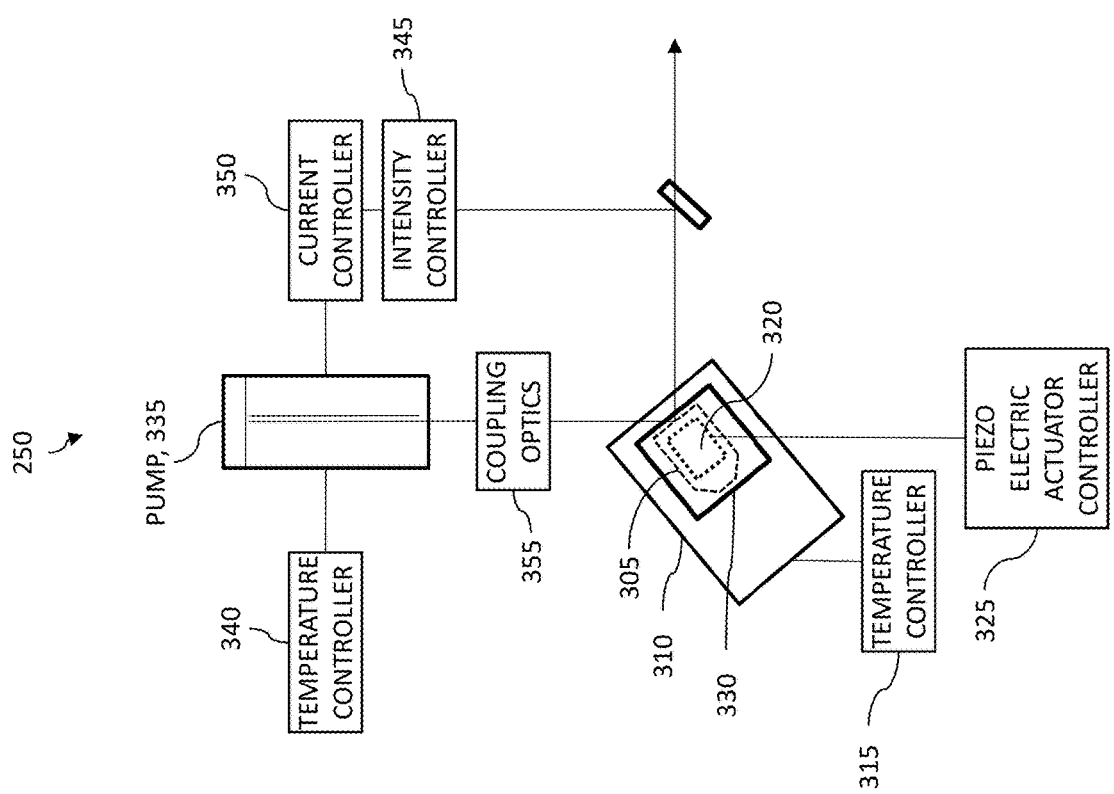
FIG. 3 depicts an exemplary master oscillator according to the disclosed embodiments.

FIG. 3 depicts an exemplary master oscillator 300 that may be implemented using the mNPRO configurations disclosed herein. The master oscillator 300 may include temperature controlled mNPRO crystal 305 mounted on a heat spreader 310.

A temperature controller 315 may be used to control the temperature of the mNPRO crystal 305, for example in the range of 15-60° C. to approximately +/−0.001° K for tuning the optical length of the mNPRO crystal 305. In some embodiments, the mNPRO crystal 305 may be mounted on a heat spreader 310, which is set on a thermoelectric cooler, whose temperature may be controlled by the temperature controller 315. In at least one embodiment, the mNPRO crystal 305 may be heated, for example by a heating element under the heat spreader controlled by the temperature controller 315. The controller 205 may issue commands through the drive electronics 230 to the temperature controller 315 for setting the temperature of the mNPRO and for requesting a measured mNPRO temperature. In some embodiments, the temperature controlled tuning may be slower than the piezo-electric transducer tuning discussed below.

A piezo-electric transducer controller 325 may apply electrical voltage to the piezo-electric transducer 320 to change the cavity length of the mNPRO crystal 305 for tuning the output of the mNPRO crystal 305. The controller 205 may issue commands through the drive electronics 230 to the piezo-electric transducer controller 325 for axially extending or retracting the transducer 320 to increase or decrease the length of the mNPRO crystal 305. In some embodiments, the piezo-electric actuator tuning may be faster than the temperature controlled tuning discussed above.

A magnet 330, or other device for applying a magnetic field to the mNPRO may be used to cause unidirectional oscillation. In some embodiments, the magnet 330 may be a permanent magnet, while in other embodiments, the magnet 330 may be an electromagnet operated by the controller 205 through the drive electronics 230. The electromagnet may be used to control the output frequency and/or direction of the output beam.

In at least one embodiment, the mNPRO crystal 305 may be pumped by a laser diode 335. The laser diode 335 may be temperature controlled by a temperature controller 340 and the output may be controlled by a current controller 350, further controlled by an intensity controller 345, which may measure the output of the mNPRO 305.

The master oscillator 300 may also include coupling optics 355 interposed between the laser diode 335 and the mNPRO crystal 305 to position and shape the output of the laser diode so that the pump and the main output laser overlap. It should be understood that spatially overlapping the output of the laser diode 335 may minimize the un-pumped region along the lasing path, and minimize the pumped region outside the lasing path, thus minimizing unwanted thermal effects. This may provide an advantage over the use of high-order multimode laser diodes where the beam cannot be focused down to a size of approximately 1 um~50 um required to accomplish the positioning to minimize the un-pumped and pumped regions. The use of the single-mode pump diode and the small pump beam size inside the crystal ensures the mNPRO crystal 305 emits its fundamental mode only, without exciting higher order modes that have larger beam sizes.

Figure 4:
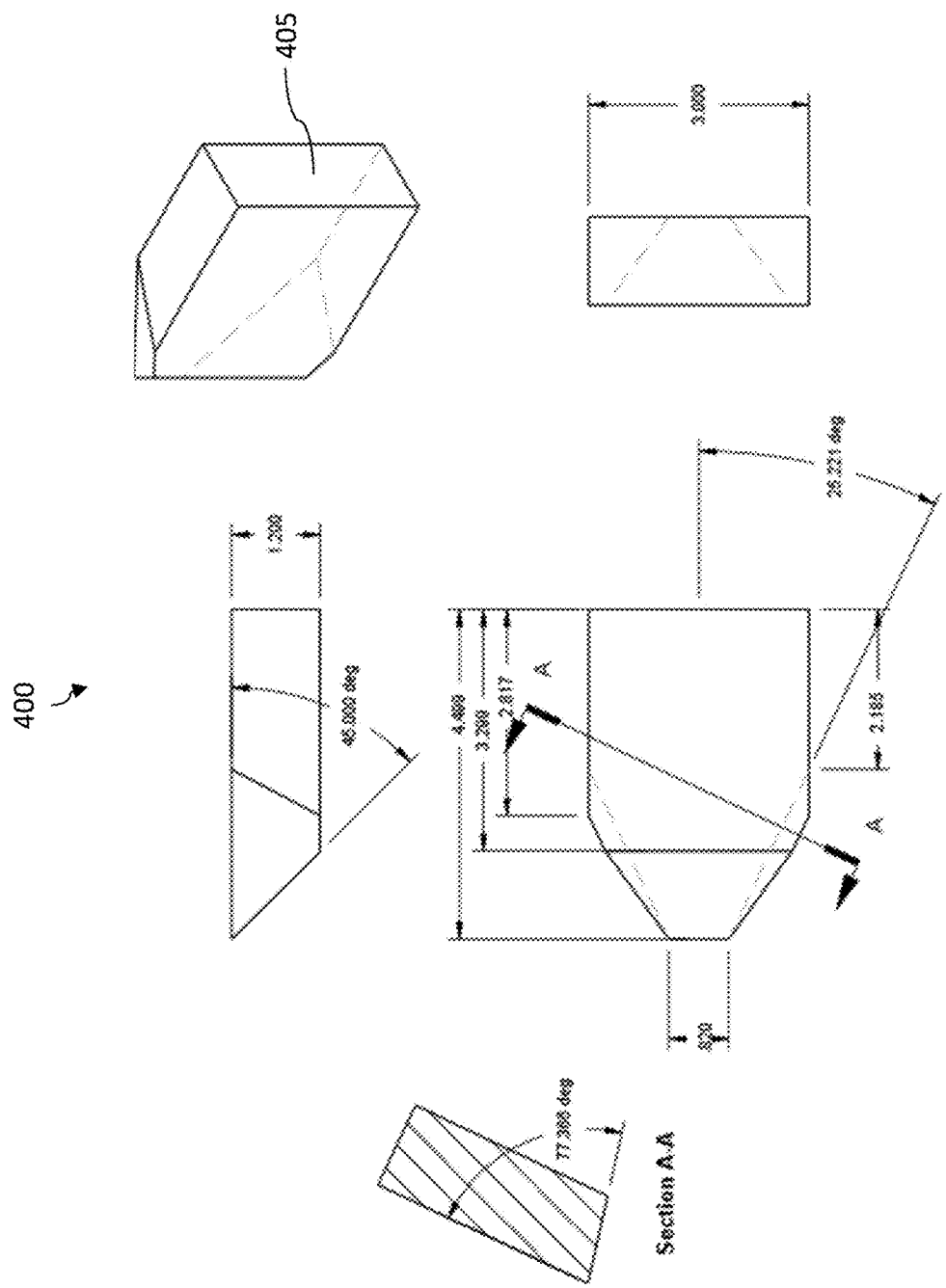
FIG. 4 shows exemplary dimensions of an mNPRO according to the disclosed embodiments.

FIG. 4 shows exemplary dimensions of an mNPRO 400 according to the disclosed embodiments, with an exemplary crystal width, height, and length of approximately 3 mm, 1.2 mm, and 4.5 mm, respectively, and a dihedral angle of approximately 45°. The end face 405 serves as the output coupler mirror of the mNPRO and the reflectivity of the end face 405 may be optimized to provide a suitable output power, for example, approximately 10~300 mW for the phase modulator 255. While the end face 405 is illustrated as a flat surface, it should be understood that the end face may be curved. In one or more embodiments, the end face 405 may have a convex shape. In some embodiments, the end face may have a radius of curvature of approximately 10 mm~1 m. A smaller radius of curvature may be desirable for low power (e.g. <100 mw) applications, since the thermal lensing inside the crystal is small. The convex shape may better define spatial modes of the laser cavity and may lower the lasing threshold. It should be understood that the illustrated dimensions are exemplary and that the mNPRO may have any suitable width, height, length, and dihedral angle, resulting in any suitable volume. In at least one embodiment, the mNPRO may have an exemplary volume in the 1-18 $mm^3$ range.

Because the dimensions of the mNPRO 400 are smaller than those of a conventional mNPRO, the laser diode 335 may be operated at a lower output power than required for prior-art NPROs, for example, approximately 50~400 mW, and may have a single-mode or low-order multimode with an exemplary beam quality factor of approximately M2<1.3, where the beam quality factor may be a ratio of a beam parameter product of a Gaussian beam to a beam parameter product of the beam from the laser diode 235 at the same wavelength.

The dimensions may also provide for a greater free spectral range (FSR), for example, from a traditional range of approximately ~6 GHz to an increased range of approximately 10~100 GHz, as the free spectral range is inversely proportional to the internal cavity length of the mNPRO. In addition, the dimensions may provide a wider hop free tuning range, makes it more robust against tuning operations and external disturbances. The larger FSR also operates to minimize coupling from the neighboring longitudinal oscillation mode, and thus reduce noise.

The reduced dimensions of the mNPRO may result in a lower volume and lower mass of the other components of master oscillator 300, such as the piezo-electric transducer 320 and the heat spreader 320. A smaller piezo-electric transducer may provide for more precise laser frequency tuning for a given displacement change, while the reduced mass of the mNPRO and the piezoelectric transducer may increase the mechanical resonant frequency of the piezo-electric transducer 320, resulting in a higher frequency tuning bandwidth and suppression of the free-running frequency noise when locked to an external frequency reference, such as high-finesse optical cavity. With a smaller mNPRO, the thermal volume of the master oscillator 300 may be reduced, resulting in a more robust mNPRO temperature control, maximizing the control bandwidth of the temperature controller, and making the temperature of the mNPRO crystal more uniform across its dimensions, leading to lower noise, improved output mode shape and stability, and reduced power requirements.

The disclosed mNPRO may be packaged into a much smaller form factor, such as a telecom-standard butterfly package, and may utilize current photonics packaging techniques and micro-optics used to package semiconductor lasers. The reduced size master oscillator 300 may more easily be integrated into spacecraft and other instrument systems.

The laser diode 335 may have an output wavelength of 808 nm to generate the emission wavelength of 1064 nm. In some embodiments, the laser diode 335 may have an 885 nm wavelength output, or even a 914 nm wavelength output. The 885 nm and 914 nm laser diodes may have epitaxial structures that are aluminum free and may exhibit high reliability, typically having a Mean Time Between Failures (MTBF) of approximately >5M hours. Furthermore, there may be a significant reduction in the thermal load generated from the quantum defects or Stokes shift, that is, the energetic difference between the pump wavelength of 885 nm or 914 nm and the laser photons at 1064 nm. As an example, pumping at a wavelength of 885 nm may reduce the thermal load by approximately ~30% compared to traditional pumping at 808 nm and may also increase the optical-to-optical efficiency by the same factor. Furthermore, the slope efficiency may increase with a reduction in thermal load.

While thermal load may be reduced, absorption at the longer pump wavelengths may decrease. While a typical material for the mNPRO may be crystalline Nd:YAG, in some embodiments, the mNPRO may be fabricated using ceramic Nd:YAG material that may allow for higher than the traditional ~1.1% Nd doping concentration in crystalline YAG substrates to compensate for the lower absorption. For example, ceramic Nd:YAG with 8% doping has been reported in the literature. In one or more embodiments, the ceramic YAG material may be fabricated with a varying Nd concentration along a length of the mNPRO crystal to increase/improve absorption depth. The varying concentration may prevent pump light from being absorbed in the front surface and distribute the absorption inside the crystal. The varying concentration may further distribute the heat load experienced by the mNPRO crystal at the pump surface and distribute the heat load along the crystal body for easier thermal management.

Regardless of crystalline or ceramic Nd:YAG, the mNPRO crystal 305 may be designed with an appropriate optical coating to emit at the most commonly used wavelength at 1064 nm, but also at other emission lines, for example, 946, 1123, 1319, 1338, 1415 and 1444 nm, etc.

Other typical mNPRO materials may include Chromium/Neodymium doped YAG (Cr:Nd:YAG), Cerium/Neodymium doped YAG (Ce:Nd:YAG), and in some embodiments, Erbium doped YAG (Er:YAG).

Figure 5:
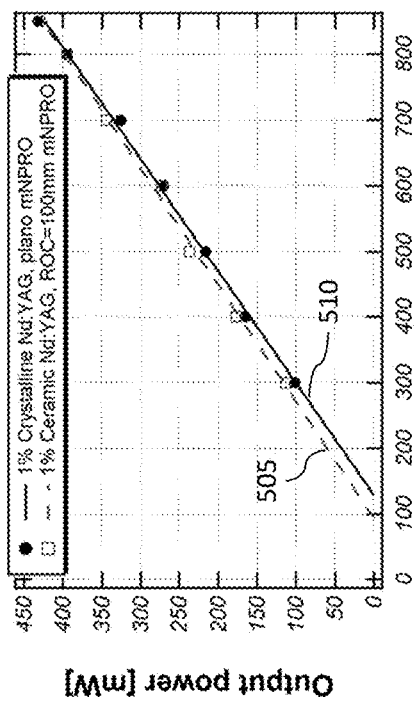
FIG. 5 shows exemplary output power of the disclosed embodiments.

FIG. 5 shows the power output by the disclosed embodiments of the mNPRO crystal 305, when the mNPRO crystal is fabricated from ceramic 505 and crystalline 510 Nd:YAG.

Figure 6:
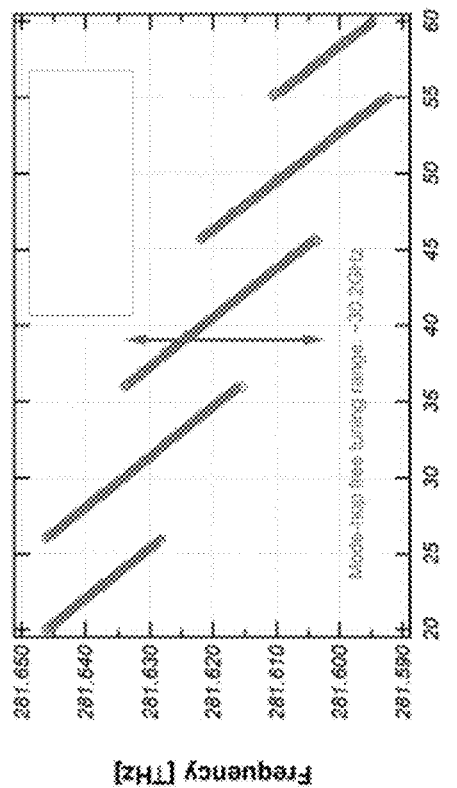
FIG. 6 illustrates that the disclosed mNPRO embodiments provide a wide mode hop free tuning range.

FIG. 6 illustrates that the disclosed mNPRO embodiments provide a wide mode hop free tuning range, for example, a range of approximately 30 GHz for a range of mNPRO temperatures of approximately 20-60° C.

Figure 7:
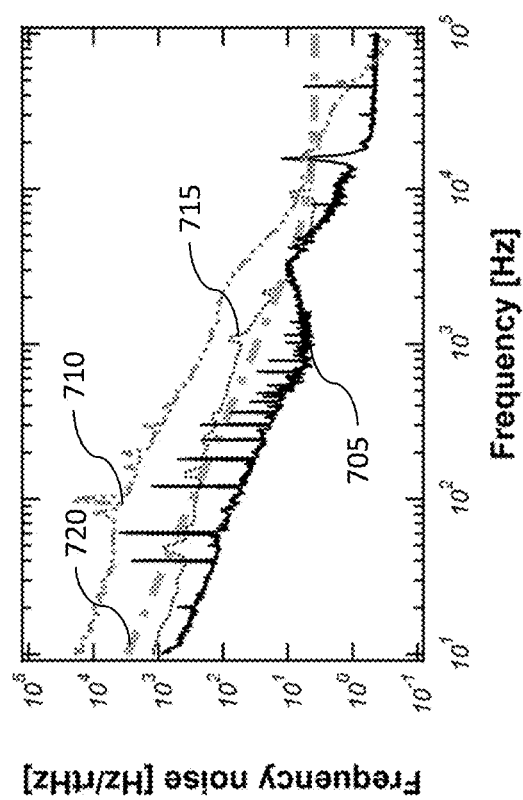
FIG. 7 illustrates the noise performance of the disclosed mNPRO embodiments.

FIG. 7 illustrates the noise performance of the disclosed mNPRO embodiments 705, compared to conventional NPRO configurations 710, 715, and further compared to exemplary requirements 720 for space based gravitational wave detection applications.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A master oscillator configured as a seed laser for a laser optical module for use in a space based gravitational wave detection system for measuring picometer variations over distances of more than 1 million kilometers featuring precision interferometry with a low noise, high power laser source, the master oscillator comprising: a temperature controlled micro non-planar ring oscillator containing a crystal; a piezo-electric transducer mounted on the micro non-planar ring oscillator; a pump laser diode, wherein the pump laser diode has an output wavelength of approximately 885 nm; coupling optics configured to couple a laser output of the pump laser diode to an end face of the micro non-planar ring oscillator; and a temperature controller operably connected to said micro non-planar ring oscillator to control the temperature of said micro non-planar ring oscillator crystal in the range of 15-60° C. to approximately +/−0.001 K with a thermal load generated with a wavelength of 885 nm reducing said thermal load by approximately 30% compared to traditional pumping at 808 nm and increasing by 30% the optical-to-optical efficiency of said micro non-planar ring oscillator; whereby the micro non-planar ring oscillator exhibits a predefined free spectral range, including a mode-hop free tuning range of predetermined width of 30 GHz for a range of micro non-planar ring oscillator temperatures of 20-60° C. with a predetermined coupling between neighboring modes, and a spatial overlap between pump and signal beams within the oscillator with a resultant minimized un-pumped region and said piezo-electric actuator with predetermined mass and volume, resulting in a predefined wide frequency tuning bandwidth, enhanced in-loop noise suppression, efficient tuning, improved thermal control with a uniform temperature, and efficient heat extraction; where the pump laser diode with a low output power of approximately 50-400 mW, with one of a single-mode and low-order multimode with a beam quality factor of approximately M2<1.3, where the beam quality factor is a ratio of a beam parameter product of a Gaussian beam to a beam parameter product of the beam from the laser diode at an equivalent wavelength.

2. The master oscillator of claim 1, wherein the micro non-planar ring oscillator has a volume of approximately 1-18 mm$^3$.

3. The master oscillator of claim 1, wherein the micro non-planar ring oscillator has a width, height, and length of approximately 3 mm, 1.2 mm, and 4.5 mm, respectively, and a dihedral angle of approximately 45°.

4. The master oscillator of claim 1, wherein the micro non-planar ring oscillator comprises an end face, wherein an output of the pump laser diode and the reflectivity of the end face are configured to provide an output power of the non-planar ring oscillator of approximately 10~500 mW.

5. The master oscillator of claim 4, wherein the end face has a convex shape.

6. The master oscillator of claim 4, wherein the end face has a radius of curvature of approximately 10 mm-1 m.

7. The master oscillator of claim 1, wherein the micro non-planar ring oscillator comprises an Nd:YAG material.

8. The master oscillator of claim 1, wherein the micro non-planar ring oscillator comprises a Cr:Nd:YAG material.

9. The master oscillator of claim 1, wherein the micro non-planar ring oscillator comprises a Ce:Nd:YAG material.

10. The master oscillator of claim 1, wherein the micro non-planar ring oscillator comprises a ceramic Nd:YAG material with Nd doping of greater than 1.1%.

11. The master oscillator of claim 1, comprising a heating element for heating the non-planar ring oscillator for tuning an optical length of the micro non-planar ring oscillator.

12. The master oscillator of claim 1, wherein the piezo-electric actuator is configured to change a cavity length of the micro non-planar ring oscillator.

13. The master oscillator of claim 1, comprising a magnet mounted proximate the non-planar ring oscillator for applying a magnetic field to the micro non-planar ring oscillator to cause unidirectional oscillation.

14. The master oscillator of claim 1, wherein the coupling optics are configured to position an output of the laser diode on an end face of the micro non-planar ring oscillator such that a pump and a main output laser overlap.

* * * * *